(12) United States Patent
Bhargava et al.

(10) Patent No.: US 6,300,640 B1
(45) Date of Patent: Oct. 9, 2001

(54) COMPOSITE NANOPHOSPHOR SCREEN FOR DETECTING RADIATION HAVING OPTICALLY REFLECTIVE COATINGS

(75) Inventors: Rameshwar Nath Bhargava, Briarcliff Manor; Nikhil R. Taskar, Ossining; Vishal Chhabra, College Point; John Victor D. Veliadis, Yonkers, all of NY (US)

(73) Assignee: Nanocrystal Imaging Corporation, Briarcliff Manor, NY (US)

( * ) Notice: Subject to any disclaimer, the term of this patent is extended or adjusted under 35 U.S.C. 154(b) by 0 days.

(21) Appl. No.: 09/197,248

(22) Filed: Nov. 20, 1998

Related U.S. Application Data

(63) Continuation-in-part of application No. 08/980,416, filed on Nov. 28, 1997, now Pat. No. 5,952,665.
(51) Int. Cl.[7] ..................................................... G01T 1/20
(52) U.S. Cl. ..................... 250/483.1; 250/361 R; 250/363.01; 250/370.01; 250/486.1
(58) Field of Search .............................. 250/483.1, 361 R, 250/363.01, 486.1

(56) References Cited

U.S. PATENT DOCUMENTS 5,446,286 * 8/1995 Bhargava ........................ 250/361 R

FOREIGN PATENT DOCUMENTS

2167279 * 5/1986 (GB) ................................ 250/486.1

* cited by examiner

Primary Examiner—Constantine Hannaher
Assistant Examiner—Andrew Israel
(74) Attorney, Agent, or Firm—William L. Botjer

(57) ABSTRACT

A composite phosphor screen for converting radiation, such as X-rays, into visible light. The screen includes a planar surface, which can be formed from glass, silicon or metal, which has etched therein a multiplicity of closely spaced microchannels having diameters of the order of 10 microns or less. Deposited within each of the microchannels is a multiplicity of phosphors which emit light when acted upon by radiation. The walls of the microchannels and/or the substrate surfaces include light reflective coatings so as to reflect the light emitted by the phosphors to the light collecting devices, such as film or an electronic detector. The coatings can be either radiation transparent or filtering/attenuating depending on the particular application.

20 Claims, 5 Drawing Sheets conventional screen

Phosphor particle size (μ)

Fig. 3
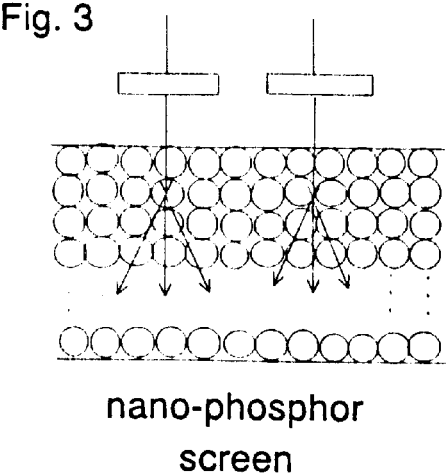
nano-phosphor screen
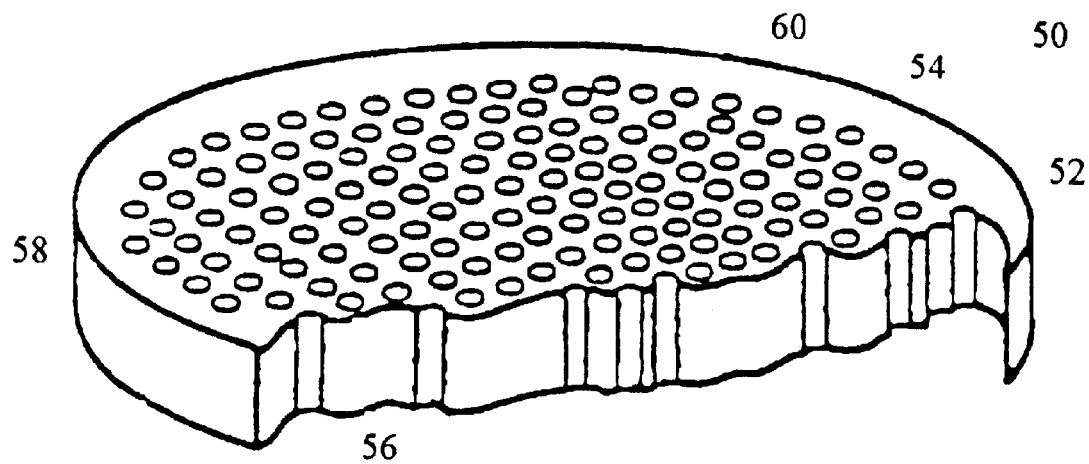
FIG. 4
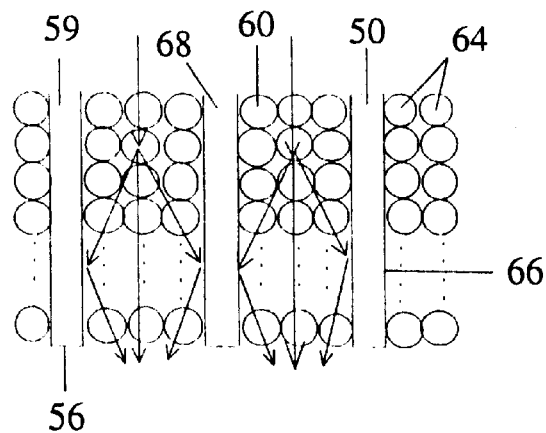
FIG. 5

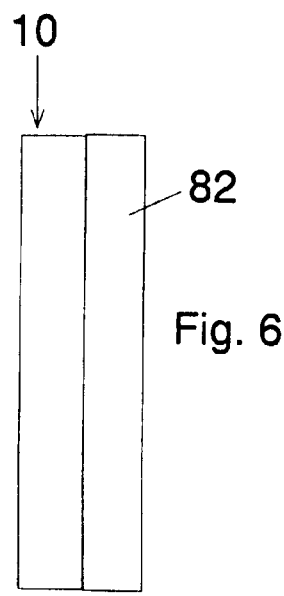
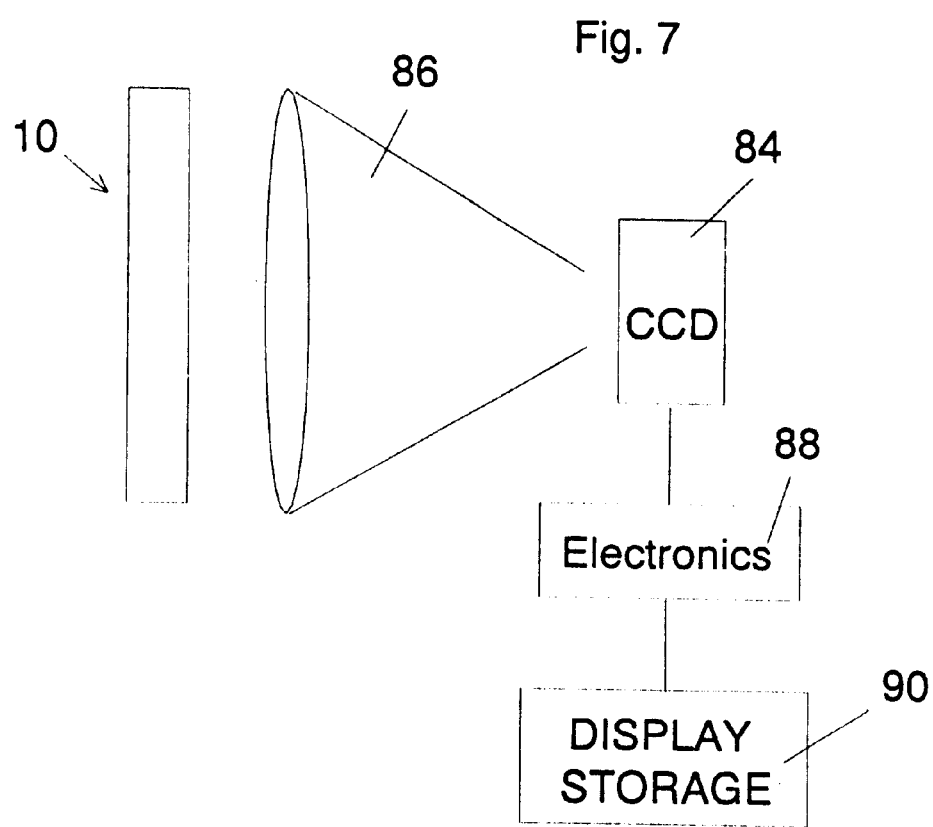

COMPOSITE NANOPHOSPHOR SCREEN FOR DETECTING RADIATION HAVING OPTICALLY REFLECTIVE COATINGS

REFERENCE TO RELATED APPLICATIONS

This application is a continuation in part of U.S. patent application Ser. No. 08/980,416 filed Nov. 28, 1997 Entitled "Composite Nanophosphor Screen for Detecting Radiation" now U.S. Pat. No. 5,952,665.

BACKGROUND AND SUMMARY OF THE INVENTION

This invention relates to a composite phosphor screen for detecting radiation, particularly X-rays, utilizing nanocrystalline sized phosphors (nanophosphors) disposed in extremely small channels (microchannels) etched in a substrate.

Fine detail visualization, high-resolution high-contrast images are required for many X-ray medical imaging systems and particularly in mammography. The resolution of X-ray film/screen and digital mammography systems is currently limited to 20 line pairs/mm and 10 line pairs/mm, respectively. One of the key reasons for this limitation is associated with the phosphor particle size in the currently used X-ray screens. In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the X-ray to light conversion efficiency, the quantum detection efficiency (e.g. the fraction of absorbed X-rays converted to visible light) and the screen efficiency (e.g. The fraction of emitted light escaping from the screen to expose the film) must not be negatively affected by the reduction of the phosphor particle size. The present invention is directed to a novel nanophosphor microchannel composite screen design, which provides high resolution, high contrast, and efficient X-ray to visible light conversion screens for X-ray imaging.

The composite phosphor screen can be used in both electronic (digital) and film (analog) X-ray imaging.

This work is based on the discovery of efficient doped nanocrystalline (DNC) phosphors in the 2–5 nm range. In U.S. Pat. No. 5,637,258 issued Jun. 10, 1997, there is disclosed a method for producing rare earth activated (Doped) metal oxide nanocrystals, i.e. phosphors These phosphors show very high conversion efficiencies from UV to visible radiation at ultrafast speeds. Measurements show that the conversion efficiency of $Y_2O_3$:Tb DNCs is comparable to that of standard phosphors when excited at a UV wavelength of 254 nm. In U.S. Pat. No. 5,446,286 issued Aug. 29, 1995 various radiation detectors using DNC's are disclosed. The present invention provides a screen grid arrangement that provides improved performance and reduced light scattering over the detectors of U.S. Pat. No. 5,446,286. The disclosures of U.S. Pat. Nos. 5,637,258 and 5,446,286 are hereby incorporated by reference as if fully set forth herein.

A conventional X-ray screen, as shown in FIG. 1 herein has a thickness of about 30–100 microns ($\mu$m) and consists of phosphor particles with a mean size between a few to 10 microns. The light generated in the screen by the incident X-ray diffuses towards the film emulsion over the finite thickness of the screen material. As the light diffuses it spreads out which results in a loss of spatial resolution and contrast in the image. To improve resolution and contrast, thinner screens would need to be employed. However, use of the standard larger-particle phosphors in thin screens, result in grainy images and poor resolution. It is therefore necessary to significantly reduce the phosphor particle size. Thinner screens with significantly smaller phosphor particles allow for very dense packing. Thus, X-ray absorption is not reduced.

One of the major challenges in reducing the particle size below 1 $\mu$m, lies in the precipitous decrease of the phosphor luminescence efficiency. This is attributed to the surface-related nonradiative processes that become dominant in the region between 1 to 0.01 $\mu$m and depicted schematically in FIG. 2. This reduction in luminescence efficiency has prevented the use of smaller particles in the past. However, the introduction of the activator (dopant/light emitting atom) in particles of sizes less than 5 nm will significantly improve the light output.

Research conducted during our work on the production of doped nanocrystals demonstrated that the light generation efficiency in doped nanocrystals can be equal to or better than the best commercial phosphor. For example, the efficiency of a 3 nm size ZnS:Mn nanocrystal is reported to be 18% while the best efficiency of the bulk ZnS:Mn is about 16%. This "size-dependent" enhancement is illustrated in FIG. 2, where the phosphor luminescence efficiency increases significantly when the size of the particle is reduced below 5 nm. This research has led to the manufacture of high efficiency phosphors with particle sizes in the range of ~3–5 nm. U.S. Pat. No. 5,637,258 is directed to a process which can produce green-emitting $Y_2O_3$:Tb nanocrystal phosphors which involve incorporation of rare-earth impurities in metal oxide phosphors. Chemical reactions which are carried out at less than 100° C., yield particle sizes in the 3–5 nm range. The luminescence of $Y_2O_3$:Tb DNC phosphors has a strong dependence on particle size. This quadratic dependence is due to the quantum confinement in the nanocrystal. The nanocrystals emit light dependent upon the dopant (activator) used, thus the use of different dopants can be used to generate light of different colors.

In U.S. Pat. No. 5,446,286 the use of films of doped nanocrystals as X-ray detection screens was proposed. Such screens are illustrated in FIG. 3 herein. The use of doped nanocrystals as the X-ray detector provides screens which are significantly faster then those of large (bulk) sized phosphors. As a comparison of FIG. 1 with FIG. 3 herein makes clear the use of nanocrystalline sized phosphors reduces the light scattering that occurs, however it does not eliminate it entirely. The present invention provides an improvement in collection efficiency over the X-ray screens of U.S. Pat. No. 5,446,286. In accordance with the present invention, the doped nanocrystals are disposed in microchannels disposed in a substrate rather than being simply arranged in a layer on the surface of the substrate.

When glass, silicon, or metal grids with channel openings of about 0.05–10 $\mu$m and aspect ratios of 10:1 to 1000:1 are packed with doped nanoparticles, a new class of high resolution composite phosphor screens become available for various medical imaging applications. Note that sub-micron sized channels would normally be called nanochannels, however for the sake of simplicity all of the less than 10 $\mu$m channels described herein will be referred to as microchannels. By proper selection of the nanophosphor and grid materials, the X-ray generated light propagates in a waveguide mode by means of internal reflection thereby significantly reducing scattering. Thus, the nano-phosphor composite screen can dramatically enhance contrast and resolution and ensure more accurate detection and better diagnostic imaging capabilities.

The present invention permits the replacement of image intensifiers and TV camera or X-ray film in many X-ray systems. Image intensifiers are large and heavy and the combination of intensifier and camera is cumbersome in a diagnostic environment. Film images require laboratory development, are not available instantaneously and must be digitized separately to be distributed electronically. The system of the present development greatly improves the portability of the X-ray imaging systems and offers the opportunity for the real time diagnosis.

A goal of the present invention is to provide a high resolution high contrast X-ray screen which can be used both for analog (film) and digital systems. The concept of microchannel/nanophosphor plate provides for the first time where the X-ray radiation can be measured in both digital and analog mode with similar resolution. Several limitations in the existing systems such as loading factors, sensitivity, contrast and resolution are optimized and improved significantly in the proposed system. A portable X-ray imaging system capable of digital, large area imaging for teleradiology can be built. Such an X-ray imaging system would include an X-ray generator, microchannel-nanophosphor composite screen, a built-in detector or a CCD or CMOS camera, processing electronics and a high resolution TV monitor.

The present invention is directed to a composite phosphor screen for converting invisible radiation, such as X-rays, into visible light. The composite phosphor screen includes a planar surface, which can be formed from glass, silicon or metal, which has etched therein a multiplicity of closely spaced microchannels having diameters on the order of 10 microns or less. Deposited within each of the microchannels is a multiplicity of nanocrystalline phosphors, having diameters of less than 100 nanometers and preferably less than 10 nanometers, which emit light when acted upon by radiation. The walls of the microchannels are arranged to reflect the light emitted by the nanophosphors down the microchannels to suitable light collecting device such as film or an electronic device.

The present application is directed to further improvements in the construction of the composite phosphor screens. The manufacture and operation of the composite phosphor screens can be optimized by the application of metallic coatings used to increase the light output of the screens, to improve the deposition of the nanocrystals in the microchannels and to selectively filter and/or attenuate the X-ray energy applied to the screens which permits X-ray of different energies to be detected in a single exposure. The coatings can be arranged so as to be reflective to light, but transparent to X-rays. The metallic coatings may be continuous or applied selectively to predetermined portions of the composite phosphor screens. Multiple composite phosphor screens can be stacked to accommodate certain applications.

X-ray composite phosphor screens constructed in accordance with the present invention provide a number of key advantages over the prior art:
1. An X-ray system based on nanophosphors and microchannels eliminates photon scattering, which results in higher resolution and contrast.
2. The absorption of X-ray in the phosphors can be enhanced by increasing the depth of the channel without increasing photon scattering. This means that phosphors which have relatively low X-ray absorption can be utilized in the present invention as the composite phosphor screen and can be made thicker to absorb the X-ray without loss of resolution due to increased light scattering.
3. The loading factor can be enhanced significantly by utilizing the properties of nanocrystals of materials which have high X-ray absorption such as lead oxide (PbO) and gadolinium oxide $Gd_2O_3$. Which means that the composite phosphor screen of the present invention can be utilized with systems using high energy X-ray which would otherwise damage conventional phosphor screens
4. The doped nanocrystalline phosphors are fast decaying phosphors which allow scanning of the X-ray without the loss of resolution. Additional time integration can be used to reduce noise. Real time imaging, such as for cardiac imaging, can become feasible with these fast phosphors.
5. An integration of the present nanocrystal/microchannel screen with Si-detector technology can yield a flat-slim X-ray imager which has a X-ray sensor on one side and a flat display on the other side.
6. The present composite phosphor screen can be optimized to be used as a Gamma-ray detector as it can be constructed so that the screen is very thick without undue light scattering, as the microchannels form light pipes for the photons emitted by the nanocrystalline phosphors.
7. The materials used in the microchannels and the host material of the nanophosphors can be arranged so that the light generated by the nanophosphors is collimated similar to light in an optical fiber. This effect occurs when the refractive index of the nanophosphor host material is greater than that of the material of the microchannel or the material used to coat the inside walls of the microchannels. This will occur if for example, if the phosphor host is $Y_2O_3$ which has a refractive index of 1.9 and the inside walls of the microchannels are coated with $SiO_2$, which has a refractive index of 1.5. This leads to enhancement of the light as well as elimination of cross talk between the microchannels.
8. X-ray systems based on the present invention can be light weight and rugged thus being readily portable.

BRIEF DESCRIPTION OF THE DRAWINGS

For a better understanding of the invention, reference is made to the following drawings which are to be taken in conjunction with the detailed description to follow in which:

FIG. 3 is a sectional view of an X-ray screen using nanocrystalline sized phosphors, as disclosed in U.S. Pat. No. 5,446,286;

FIG. 4 is a cut away view of a composite phosphor screen in accordance with the present invention comprising nanocrystalline phosphors disposed in a multiplicity of microchannels etched into the surface of the substrate, note that the nanocrystalline phosphors are not drawn to scale;

FIG. 5 is a sectional view of the radiation and light path of the action of the nanocrystalline phosphors as disposed in the microchannels of the composite phosphor screen of the present invention;

FIG. 6 is a sectional view of the composite phosphor screen of the present invention used in conjunction with conventional photographic film;

FIG. 7 is a sectional view of the composite phosphor screen of the present invention used in conjunction with a CCD/CMOS light detector and suitable collection optics;

DESCRIPTION OF THE PREFERRED EMBODIMENTS

Figure 1:
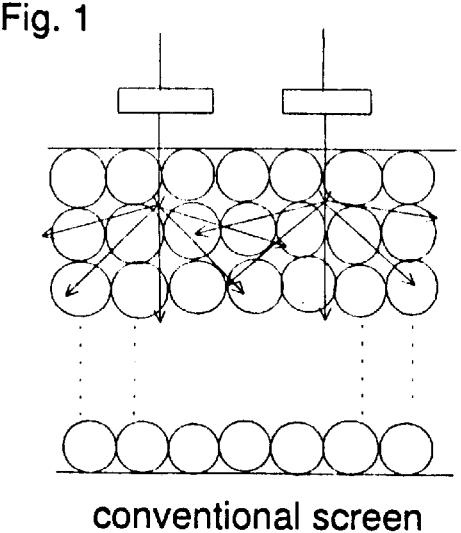
FIG. 1 is sectional view of a conventional X-ray screen using large sized phosphors.
Figure 2:
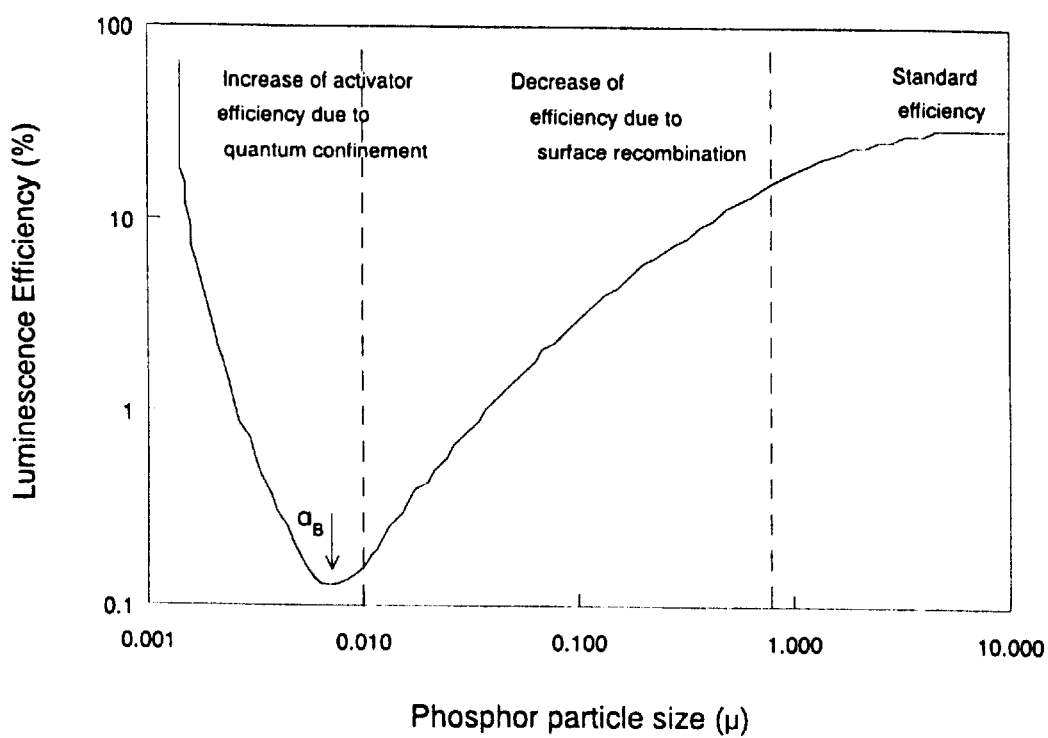
FIG. 2 is a graph plotting luminescent efficiency as a function of phosphor particle size.

FIG. 4 illustrates a composite phosphor screen 50 for converting radiation impinging thereon to visible light which has particular use in an X-ray system. Composite phosphor screen 50 comprises a substrate 52 which has an upper planar surface 54, a lower planar surface 56 and a cylindrical edge 58. Etched from upper surface 54 to lower surface 56 of substrate 52 are a multiplicity of extremely small channels ("microchannels") 60 which have a width on the order of 0.05–10 μm (microns) or 50 to 5000 nm (nanometers). Microchannels 60 have an aspect ratio (ratio of width to length) of 10:1 to 1000:1 and a wall thickness on the order of 50–2000 nm. The material used as the substrate is not critical: it can be glass, silicon (crystalline, alpha, amorphous, or polysilicon as used in the fabrication of integrated circuits) as well as metals such as aluminum as techniques for the micro formation of microchannels exist for all of these materials. Furthermore, substrate 52 need not be circular in plan view, as it can be of any configuration and larger sizes can be made from a number of substrates.

FIG. 5 is an enlarged view of substrate 52 and its microchannels 60 in which are disposed the doped nanocrystals 64. The material used as substrate 52 is selected so that the light emitted by the doped nanocrystals is directed down the channels by reflection so that the microchannels act as light guides similar to cladded optical fiber. Light guiding down the microchannels can be accomplished by providing that the Index of Refraction of the substrate is less than that of the nanocrystals. Many glasses have a refractive index on the order of 1.5–1.55 while the refractive index of $Y_2O_3$ nanocrystals is 1.91 and the refractive index of PbO is 2.5 which assure internal reflection. This internal reflection of light minimizes losses due to scattering and increases the collection efficiency If substrate 52 is silicon, after the etching of the microchannels 60 in substrate 52 known semiconductor processing techniques can be used to provide the inner walls 66 of microchannels 60 with a coating 68 of $SiO_2$ of thicknesses on the order of 0 to 1 micron so as to provide for the internal reflection of light emitted by the nanocrystals 64. The $SiO_2$ coating inside the channels has an IR of 1.51 which will keep the light generated in the $Y_2O_3$ nanocrystals confined in the microchannels. In many applications the silicon itself may have sufficient reflectivity without the need for $SiO_2$. If substrate 50 is formed from aluminum the walls of the microchannels will reflected light. Furthermore a cladding layer of aluminum oxide $Al_2O_3$, which has a refractive index of 1.77 can be disposed on the inside walls of the microchannels in an aluminum substrate.

As shown in FIG. 5 an X-ray entering the upper portion of microchannels 60 will impinge on nanocrystals 64 and cause the emission of light which will be reflected by walls 66 and coating 68 (if present). The X-ray are absorbed by the nanophosphors as they proceed down microchannels 60. As the microchannels form light pipes to minimize light scattering the length of the microchannels can be increased so that the number of the nanocrystals is also increased so as to completely absorb the X-ray radiation even when using nanophosphors that have low X-ray absorption. Since the microchannels length can be increased without undue light scattering, the present composite phosphor screens can be used to detect other than X radiation, such as gamma rays which require thick screens. Multiple substrates containing nanophosphors in microchannels may be "stacked", if necessary to provide the required thickness.

The nanocrystals may be deposited in the microchannels by means of electrophoreretic and/or electrostatic techniques in which opposite electrical charges are placed in the nanocrystals suspended in a liquid medium and the microchannels so that the nanocrystals are drawn into the microchannels. Controlled osmotic, settling and vacuum processes may also be used to deposit the nanophosphors in the microchannels. This will assure a dense packing of the nanocrystals in the microchannels. In a further embodiment of this invention, after deposition of the nanocrystals in the microchannels, the substrate can be annealed at 300° C. to 1000° C. (depending upon the material of the substrate) to cause the nanocrystals to fuse into "quantum wires" which will serve to improve the quantum efficiency of the conversion of the impinging radiation into light.

In addition to phosphors formed from $Y_2O_3$ (Yttrium Oxide) activated with rare earth elements and the other metal oxides set forth in U.S. Pat. No. 5,637,258 a particularly suitable phosphor for use in an X-ray system is doped PbO (lead oxide) because of lead oxides known ability as an absorber of X-rays. The energy bandgap of PbO is in the near-infrared region. However, when prepared in the 2–3 nm size range, this energy bandgap is shifted to the visible region (>2.1 eV or <590 nm). $Eu^{3+}$ doped nanocrystalline PbO will yield a red emitting doped nanocrystalline phosphor. Thus, PbO nanocrystalline phosphors will efficiently absorb X-ray radiation and down convert it to 611 nm visible radiation. In addition to PbO, other particularly suitable phosphor materials for X-ray use are gadolinium oxide Gd2O3 and gadolinium oxysulfide $Gd_2O_2S$ which also have excellent X-ray absorbing properties.

In traditional X-ray systems the light detection device is a sheet of photographic film, more recently electronic light detection devices such as Charged Coupled Devices (CCD) and CMOS silicon devices have been used. The composite phosphor screen of the present invention is compatible with both type of light collection systems. FIG. 6 illustrates the phosphor screen 10 of the present system disposed proximate to a standard piece of photographic film 82. X-ray impinging on composite phosphor screen 10 and will cause the generation of visible light which will be directed down the microchannels towards film 82 which will cause the exposure of the film, which upon subsequent development, will form the X-ray image.

FIG. 7 illustrates phosphor screen 10 of the present system used in conjunction with s standard sized CCD, CMOS or other type of electronic light detector 84. Disposed between composite phosphor screen 10 and detector 84 is a collection lens 86 which directs the light emitted by screen 10 to detector 84 which outputs an electronic signal representative of the light impinging thereon to electronics 88 and thereafter to a display and/or storage device 90. Collection lens 86 can be a projection lens similar to those used in projection television systems but used in "reverse".

Figure 8:
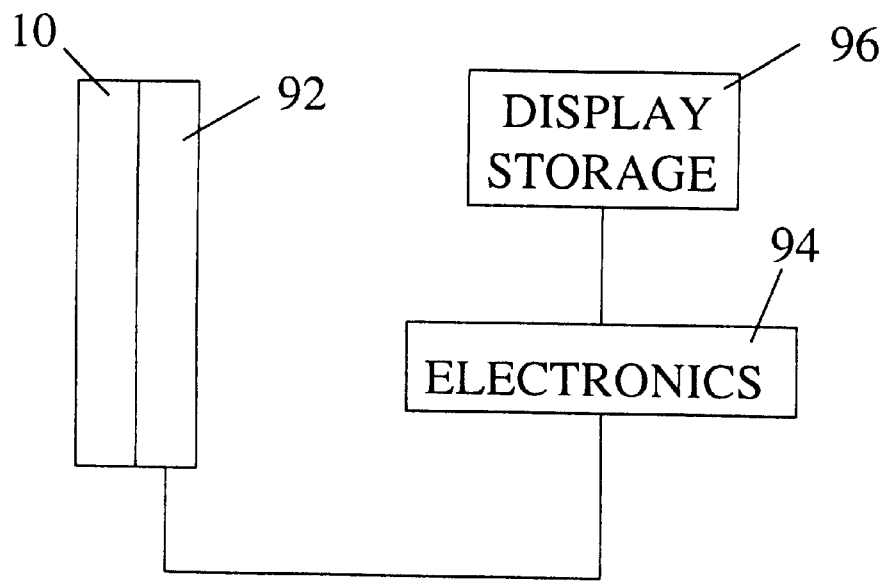
FIG. 8 is a sectional view of the composite phosphor screen of the present invention used in conjunction with an electronic light detector which is integrated with the composite phosphor screen.

The fact that the composite phosphor screens of the present invention can be formed from glass or silicon provides the benefit that the screen and light detection apparatus as well as the display screen can be integrated into a single unit. FIG. 8 illustrates composite phosphor screen 10 which is integrated with the light collection device 92 which eliminates the need for light collection optics. Standard semiconductor formation techniques may be used to form light collection device 92 on the rear of composite phosphor screen 10. Thereafter the electrical signals of light collector 92 is applied to electronics 94 and to an electronic display and/or storage device 96. Light collector 92 can be a CCD or an CMOS silicon light sensor which is based on thin film display technology and which is readily available in 12 inch diagonal or larger sizes. It is to be noted that in CCD/CMOS detectors the usual pixel size is 5–25 microns, this means that each pixel is acted upon by one to many microchannels, depending upon the size and spacing of the microchannels. Furthermore, since the microchannels are orders of magnitude larger than the nanophosphors there are thousands to millions of nanophosphers per microchannel. Thus composite phosphor screens constructed in accordance with the present invention, provide a great redundancy of information, as there are many light generators in each microchannel and many microchannels per pixel. This provides uniform, reliable, sensitive and accurate X-ray detection.

Figure 9:
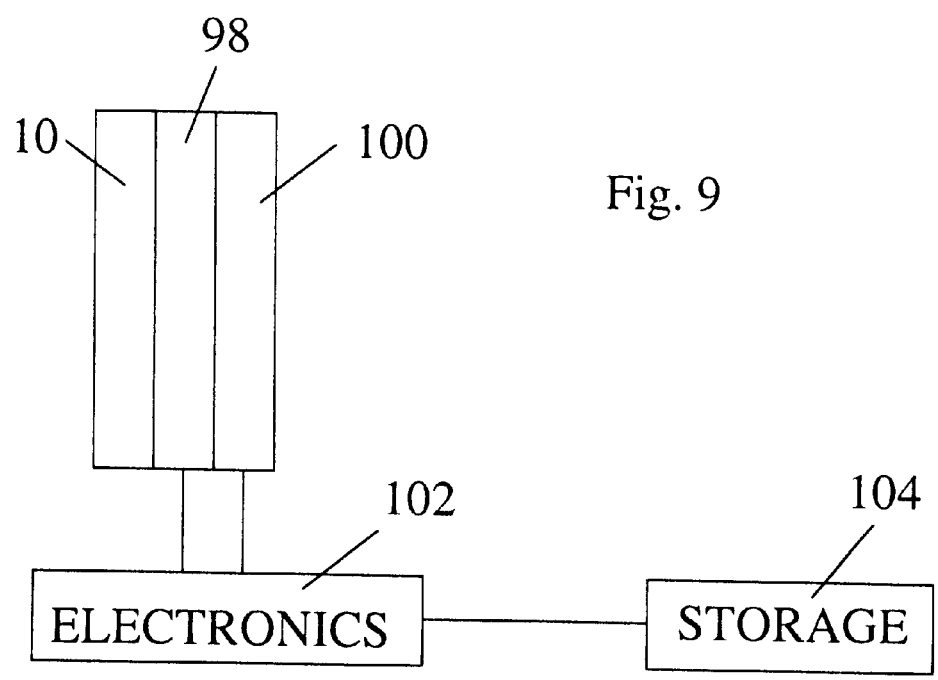
FIG. 9 is a sectional view of the composite phosphor screen of the present invention used in conjunction with an electronic light detector and a display which is integrated with the composite phosphor screen.

FIG. 9 takes the screen/light detector integration of FIG. 8 a step further in which the composite phosphor screen, the light detector and the display device are integrated into a single unit. In FIG. 9 composite phosphor screen 10 is integrated with a light detector 98, which can be an amorphous silicon sensor, and a display 100 which can be, by way of example only, a thin film transistor display. Since composite phosphor screen 10, detector 98 and display 100 can each be formed from glass or silicon integration of this units is made feasible by the use of composite phosphor screens of the present invention. Light detector 98 is connected to electronics 98 which is in turn connected to provide the signal to display and optionally to an electronic storage device 104.

Figure 10:
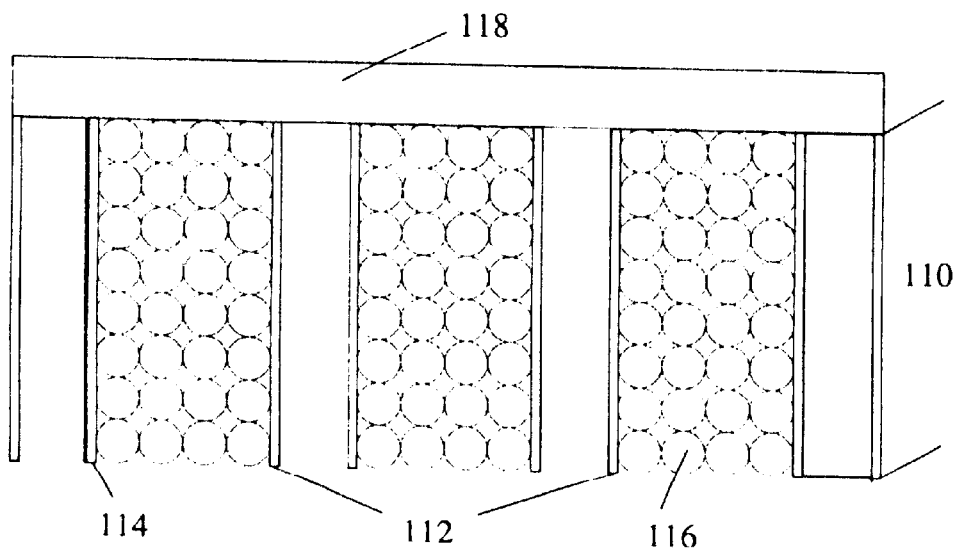
FIG. 10 is a sectional view of a composite phosphor screen of the present invention using optically reflective coatings applied to the walls of the microchannels and/or atop the substrate.

FIG. 10 illustrates a composite phosphor screen 110 whose microchannels 112 include an optically reflective coating 114 along their walls. This will serve to enhance the light output from the nanocrystals 116 disposed therein as any light directed at the walls of the microchannels by the nanophosphors will not be lost. Particularly suitable materials for the reflective coatings are metals such as gold, silver, platinum, palladium, nickel and aluminum which are also electrically conductive. The use of reflective wall coatings permits the use of screen materials which do not have a refractive index suitable to optically guide light emitted by the nanophosphors down the microchannels, or which are not reflective. The use of electrically conductive coatings also facilitates filling of the microchannels with nanophosphors as an electric connection can be made to the coating so that it acts as an electrode to attract the nanophosphors in the microchannels in electrophoretic deposition of nanophosphors. Aluminum is a particularly suitable material for use as a coating as it is inexpensive, optically light reflective, electrically conductive and X-ray transparent. The use of reflective coatings will minimize "cross-talk" between adjacent microchannels. The coatings can be applied to the walls of the microchannels by any suitable means such as electroless (chemical) plating, electroplating and/or integrated circuit deposition techniques.

As is also shown in FIG. 10, in addition to the coating applied to the walls of microchannels 112 a second coating 118 can be applied atop the composite phosphor screen. In operation coating 118 is X-ray transparent but optically reflective, as such X-ray will pass through the coating causing the nanophosphors to emit light which will be reflected by the microchannels wall coating 114 and top coating 118 thus maximizing light output to the detectors. In another arrangement the top coating 118 is X-ray transparent and optically reflective but coating 114 applied to the walls of the microchannels is optically reflective and X-ray absorbing (gold, platinum and other high atomic number materials are suitable) in order to further minimize cross-talk between adjacent microchannels.

Figure 11:
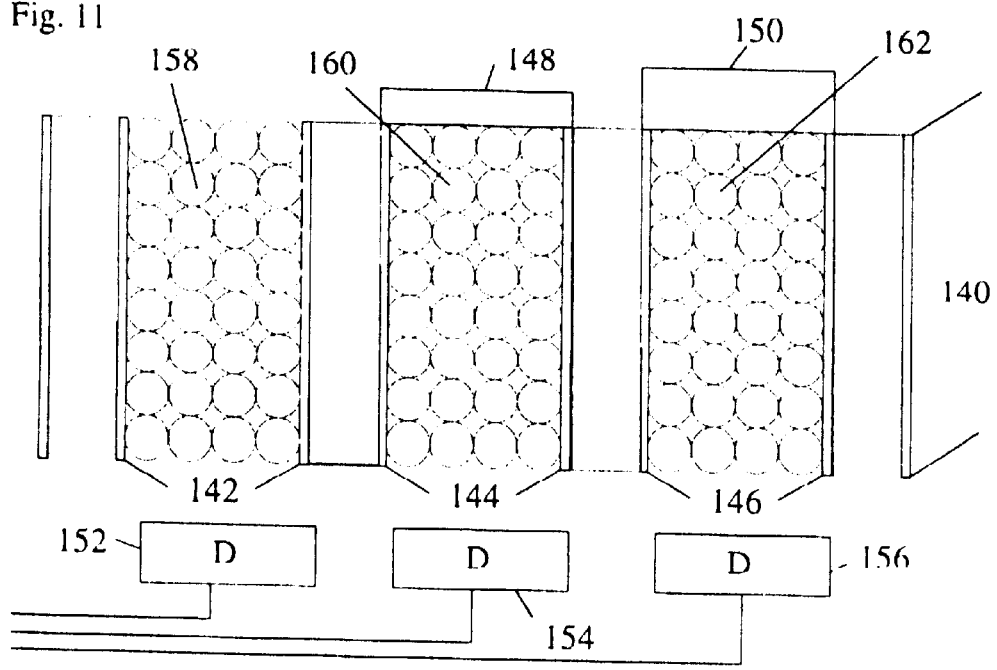
FIG. 11 is a sectional view of the composite phosphor screen of the present invention using radiation filtering/attenuating coating of differing attenuation levels.

In addition to optically reflective coatings other types of coatings may be disposed on the substrates, FIG. 11 illustrates a substrate 140 which has radiation attenuating and/or filtering coatings applied thereto. Radiation filtering refers to the properties of certain metals to attenuate only certain X-ray frequencies, while allowing other X-ray frequencies to pass with lesser degrees of attenuation, similar to a colored optical filter. Radiation attenuating coatings are used to prevent radiation of certain energy levels from reaching the nanophosphors located in certain of the microchannels, this permits different microchannels to be sensitive to different X-ray energies. Substrate 140 includes microchannels 142 which have no radiation attenuating coatings applied thereto, microchannels 144 which have a first level of radiation attenuating coating 148 disposed atop them facing the source of radiation and microchannels 146 which have a second level of radiation coating 150 disposed atop them. Disposed beneath microchannels 142, 144 and 146 are radiation detecting elements 152, 154 and 156 which will detect the light emitted from the nanophosphors 158, 160 and 162 disposed in microchannels 142, 144 and 146.

In operation detector 152 under microchannel 142 will be activated by X-ray of any energy level above the minimum threshold of nanophosphors 158 as microchannel 142 has no X-ray attenuating material disposed above it. Detector 154 under microchannel 144 will be activated by only radiation of energy levels sufficient to penetrate first level radiation attenuating coating 148 disposed above it. Thus nanophosphor 160 in microchannel 146 will emit light to detectors 154 only upon exposure to radiation above the threshold set by coating 148. Detector 156 under microchannel 146 will be activated only by radiation of energy levels sufficient to penetrate second level radiation attenuating coating 150 disposed above it. Thus nanophosphors 162 in microchannel 146 will emit light to detectors 156 only upon exposure to radiation above the threshold set by second level coating 148. In sum, radiation sufficient to penetrate second coating 150 will activate all detectors 152, 154 and 156; radiation sufficient to penetrate first level coating 148 but insufficient to penetrate second level coating 150 will activate detectors 152 and 154; radiation insufficient to penetrate either first level coating 148 or second level coating 150 will activate only detector 152.

Thus the radiation attenuating coatings applied to the composite phosphor screens of the present invention will permit discrimination of various radiation levels. Suitable radiation attenuating coatings include tungsten(W), tin (Sn), lead (Pb) lead oxide (PbO) and filtering coatings such as aluminum, tin, molybdenum, tungsten and gold. The levels of radiation attenuation of the coatings can be achieved by using different materials and/or different coating thicknesses. The number of different radiation levels that is required is controlled by the needs of the application and the differing thickness and materials used. The use of radiation attenuating coatings is particularly suitable for use with X-rays as it facilitates tissue discrimination. The radiation attenuating coatings can be applied to the substrate by any suitable means such as electroplating and/or integrated circuit deposition techniques.

The present invention can be used with a variety of nanocrystalline host materials such as $Y_2O_3$, $Gd_2O_3$, $Gd_2O_2S$ and PbO described above. Each of these may be doped with europium which will cause the phosphor to emit red light, terbium which will emit green and thulium which will emit blue. Other suitable host materials are zinc sulfide (ZnS) and zinc oxide (ZnO) cadmium oxide (CdO) and cadmium sulfide (CdS) which can be doped with manganese (Mn) as well as transition and rare earth metals. The fact that the nanocrystalline phosphors are disposed in discrete locations, i.e. the individual microchannels, means that different dopants can be disposed in different areas of the substrate to generate different colors of light, thus RGB phosphor screens can be constructed with the present development. Furthermore, in addition to different dopants, different host materials can be disposed in varying locations on the substrate as well, these different materials can be exited so as to have different light emissions to dissimilar X-ray energies to provide a color keyed display of X-ray energy distribution. Differing phosphors may be deposited in only certain of the microchannels by masking off some areas of the substrate, depositing nanophosphors in the unmasked microchannels and thereafter masking off the already deposited areas followed by deposition of the dissimilar hosts and dopants. Furthermore, substrates having differing types of phosphors and or filtering/attenuating coatings may be stacked atop each other such that the red emitting phosphors are in one substrate, the green in a second and the blue in a third. Composite phosphor screens of the present invention may also be used with non-nanocrystalline sized phosphors, ie. phosphors of up to 2 microns in diameter.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A composite phosphor screen for the conversion of radiation impinging thereon to visible light, comprising:
    a) a substrate having a planar surface;
    b) a multiplicity of microchannels extending into the surface of the substrate, said microchannels having a diameter of less than 10 microns,
    c) a multiplicity of phosphors disposed in each of said microchannels, said phosphors emitting visible light when exposed to radiation, and
    d) a light reflective coating disposed along the walls of said microchannels being arranged so as to reflect the light emitted by said phosphors.

2. The composite phosphor screen as claimed in claim 1, wherein the reflective coating disposed along the walls of said microchannels is transparent to the radiation impinging thereon.

3. The composite phosphor screen as claimed in claim 1, wherein the reflective coating disposed along the walls of said microchannels is at least partially absorbing of the radiation impinging thereon.

4. The composite phosphor screen as claimed in claim 1, wherein the reflective coating disposed along the walls of said microchannels is electrically conductive.

5. The composite phosphor screen as claimed in claim 1, wherein the reflective coating disposed along the walls of said microchannels is a metallic coating.

6. The composite phosphor screen as claimed in claim 5, wherein the reflective coating disposed along the walls of said microchannels is selected from the group consisting of gold, silver, platinum, palladium, nickel and aluminum.

7. The composite phosphor screen as claimed in claim 1, wherein the radiation comprises X-ray and the phosphors emit light upon exposure to X-rays.

8. The composite phosphor screen as claimed in claim 1, wherein the phosphors have diameters of less than 100 nanometers.

9. A composite phosphor screen for the conversion of radiation impinging thereon to visible light, comprising:
    a) a substrate having a planar surface;
    b) a multiplicity of microchannels extending into the surface of the substrate, said microchannels having a diameter of less than 10 microns,
    c) a multiplicity of phosphors disposed in each of said microchannels, said phosphors emitting visible light when exposed to radiation, and
    d) a light reflective coating disposed atop the phosphors so as to reflect the light emitted by said phosphors.

10. The composite phosphor screen as claimed in claim 9, wherein the reflective coating disposed atop the phosphors is transparent to the radiation impinging thereon.

11. The composite phosphor screen as claimed in claim 9, wherein the reflective coating disposed atop the phosphors is at least partially absorbing of the radiation impinging thereon.

12. The composite phosphor screen as claimed in claim 9, wherein the reflective coating disposed atop the phosphors is electrically conductive.

13. The composite phosphor screen as claimed in claim 9, wherein the reflective coating disposed atop the phosphors is a metallic coating.

14. The composite phosphor screen as claimed in claim 13, wherein the reflective coating disposed atop the phosphors is selected from the group consisting of gold, silver, platinum, palladium, nickel and aluminum.

15. The composite phosphor screen as claimed in claim 9, wherein the radiation comprises X-ray and the phosphors emit light upon exposure to X-rays.

16. A composite phosphor screen for the conversion of radiation impinging thereon to visible light, comprising:
    a) a substrate having a planar surface;
    b) a multiplicity of microchannels extending into the surface of the substrate, said microchannels having a diameter of less than 10 microns,
    c) a multiplicity of phosphors disposed in each of said microchannels, said phosphors emitting visible light when exposed to radiation, and
    d) radiation attenuating means disposed so as to attenuate radiation of at least certain frequencies impinging upon selected ones of the microchannels so that the phosphors of the selected microchannels will emit light in response to different radiation energy levels.

17. The composite phosphor screen as claimed in claim 15, wherein the radiation attenuating means comprise a coating disposed atop certain of the microchannels.

18. The screen as claimed in claim 15, further including means for collecting the visible light emitted by the phosphors.

19. The composite phosphor screen as claimed in claim 15, wherein the radiation attenuating means comprise a coating having differing levels of radiation attenuation disposed atop differing ones of the microchannels.

20. The composite phosphor screen as claimed in claim 15, wherein the radiation attenuating means comprise a coating having the levels of radiation attenuation regardless of radiation frequency.

* * * * *